United States Patent
Ono et al.

(10) Patent No.: US 6,717,647 B2
(45) Date of Patent: Apr. 6, 2004

(54) LIQUID CRYSTAL DISPLAY PANEL SEALING APPARATUS HAVING A PLURALITY OF PRESSURIZING ACTUATORS

(75) Inventors: Fumio Ono, Tokyo (JP); Eiichirou Aoki, Tokyo (JP); Hirokazu Arai, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 259 days.

(21) Appl. No.: 09/772,955

(22) Filed: Jan. 31, 2001

(65) Prior Publication Data

US 2002/0018170 A1 Feb. 14, 2002

(30) Foreign Application Priority Data

Feb. 24, 2000 (JP) .......................... 2000-047328

(51) Int. Cl.[7] ..................... G02F 1/13; G02F 1/1339
(52) U.S. Cl. ................ 349/190; 349/187; 428/1.53
(58) Field of Search ................. 349/190, 187; 428/1.53; 445/24

(56) References Cited

U.S. PATENT DOCUMENTS

| 5,691,764 A | * | 11/1997 | Takekoshi et al. ............. 348/86 |
| 6,190,224 B1 | * | 2/2001 | Byun et al. .................... 445/24 |
| 6,297,869 B1 | * | 10/2001 | Choo et al. .................. 349/187 |
| 6,379,759 B2 | * | 4/2002 | Kamoi et al. ............... 428/1.53 |

FOREIGN PATENT DOCUMENTS

| JP | 401114822 A | * | 5/1989 |
| JP | 5-265013 | | 10/1993 |
| JP | 8-262463 | | 10/1996 |

* cited by examiner

*Primary Examiner*—Julie-Huyen L. Ngo
(74) *Attorney, Agent, or Firm*—Sughrue Mion, PLLC

(57) ABSTRACT

In a liquid crystal display panel sealing apparatus, a cassette is provided to accommodate a plurality of laminated liquid crystal display panels into which liquid crystal is injected, and a pressurizing unit is provided to accommodate the cassette. The pressurizing unit includes a plurality of pressurizing actuators for pressurizing the liquid crystal display panels.

13 Claims, 12 Drawing Sheets

LIQUID CRYSTAL DISPLAY PANEL SEALING APPARATUS HAVING A PLURALITY OF PRESSURIZING ACTUATORS

BACKGROUND OF THE INVENTION

1. Field of the Invention

The present invention relates to a liquid crystal display (LCD) panel sealing apparatus.

2. Description of the Related Art

Generally, LCD panels are manufactured as follows.

First, a seal material is coated at a periphery of a substrate except for liquid crystal injection openings by using a screen printing process. On the other hand, display spacers are dispersed onto a counter substrate by using a spacer dispersing apparatus. Then, the substrate is aligned with the counter substrate, and the seal material is hardened by applying heat or ultraviolet irradiation thereto. Then, liquid crystal is injected by a vacuum process from the liquid crystal injection openings into the gap between the substrate and the counter substrate.

Next, the liquid crystal injection openings are sealed by a seal material made of ultraviolet cured resin by an LCD panel sealing apparatus.

Finally, the outer surfaces of the substrate and the counter substrate are rinsed, and then, polarization plates are adhered thereto, thus completing the LCD panels.

In a first prior art LCD panel sealing apparatus (see JP-A-5-265013), a cassette for accommodating a plurality of laminated LCD panels is mounted on a block fixed at a bottom of a strut. Also, a holder for pushing the LCD panels is mounted slidably on the strut, and is driven by an air cylinder. This will be explained later in detail.

In the above-described first prior art LCD panel sealing apparatus, however, since there is only one pressurizing element, i.e., only one air cylinder, if the pressure within each LCD panel is non-uniform, it is impossible to make the pressure uniform. Particularly, when the size of LCD panels is changed, the pressure center of each LCD panel may be shifted to make this pressure more non-uniform. As a result, the gap between the substrate and the counter substrate of each LCD panel fluctuates, so that irregular display occurs, thus degrading the display quality.

In a second LCD panel sealing apparatus (see JP-A-8-262463), a plurality of holders for accommodating LCD panels are provided between two plates pushed by an air cylinder. Each of the holders has a flat bottom housing portion for holding one of the LCD panels where a spacer sheet is provided. As a result, the depth of the flat bottom housing portion is smaller than the thickness of the LCD panels. Also, protrusions are provided on the back surface of the holders, while recesses are provided on the front surface of the holders in back to back correspondence to the protrusions. Thus, the gap between the substrate and the counter substrate of each LCD panel is adjusted by the spacer sheet. This also will be explained later in detail.

Even in the above-described second prior art LCD panel sealing apparatus, however, since there is only one pressurizing element, i.e., only one air cylinder, if the pressure within each LCD panel is non-uniform, it is impossible to make the pressure uniform. As a result, the gap between the substrate and the counter substrate of each LCD panel fluctuates, so that irregular display occurs, thus degrading the display quality. In addition, when the size of LCD panels is changed, the holders per se have to be changed, which would increase the manufacturing cost.

SUMMARY OF THE INVENTION

It is an object of the present invention to provide an LCD panel sealing apparatus capable of making the pressure within each LCD panel uniform.

Another object is to decrease the manufacturing cost.

According to the present invention, in an LCD panel sealing apparatus, a cassette is provided to accommodate a plurality of laminated LCD panels into which liquid crystal is injected, and a plurality of pressurizing actuators are provided to pressurize the LCD panels. Thus, the pressurizing power of the pressurizing actuators are individually controlled to make the pressure within each LCD panel uniform.

Also, the cassette includes a guide unit for guiding the LCD panels in accordance with a size of the LCD panels. Thus, even when the size of the LCD panels is changed, the LCD panels can be easily accommodated in the cassette.

BRIEF DESCRIPTION OF THE DRAWINGS

The present invention will be more clearly understood from the description set forth below, as compared with the prior art, with reference to the accompanying drawings, wherein.

DESCRIPTION OF THE PREFERRED EMBODIMENT

Before the preferred embodiment, prior art LCD panel sealing apparatuses will be explained with reference to FIGS. 1, 2 and 3.

Figure 1:
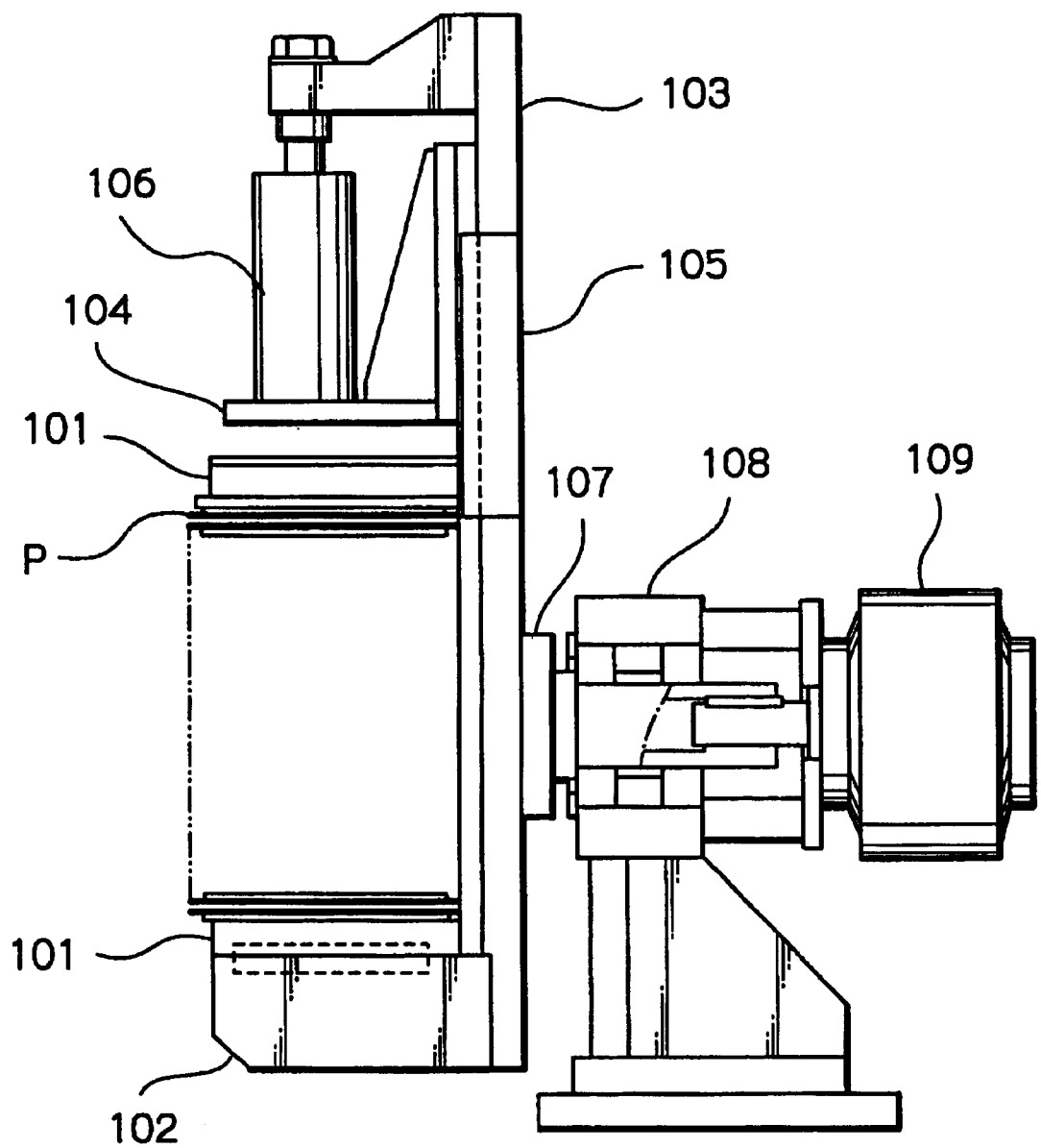
FIG. 1 is a side view illustrating a first prior art LCD panel sealing apparatus according to the present invention.
Figure 2:
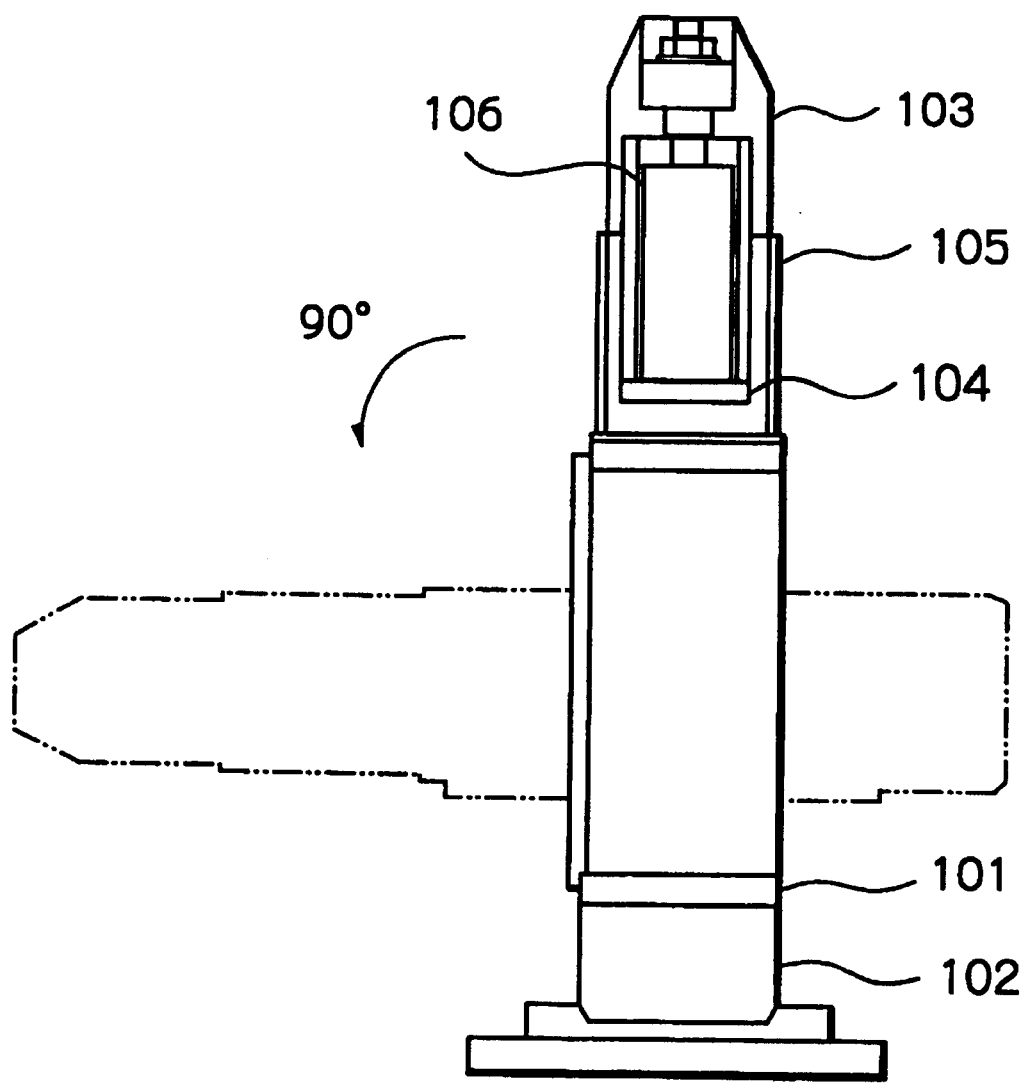
FIG. 2 is a front view of the LCD panel sealing apparatus of FIG. 1 for explaining the operation thereof.

In FIG. 1, which illustrates a first prior art LCD panel sealing apparatus (see JP-A-5265013), reference numeral 101 designates a cassette for accommodating a plurality of laminated LCD panels P where liquid crystal is already injected. The cassette 101 is mounted on a block 102 fixed at a bottom of a strut 103. Also, a holder 104 for pushing the LCD panels P is mounted slidably by a slider 105 on the strut 103, and is driven by an air cylinder 106. The strut 103 is rotatably supported by a shaft 107 at a rotating mechanism 108 which is driven by a rotary actuator 109.

When the air cylinder 106 is driven to push down the holder 104, the LCD panels P are gradually pressurized to a maximum pressure state, so that liquid crystal spills from the liquid crystal injection openings (not shown) of the LCD panels P. Then, as illustrated in FIG. 2, the strut 103 is rotated by an angle of 90° using the rotating mechanism 108, so that the liquid crystal injection openings (not shown) of the LCD panels P are upward. Then, a seal material made of ultraviolet cured resin is coated on the LCD panels P at the liquid crystal injection openings (not shown), and the seal material is cured by ultraviolet irradiation. Thus, the liquid crystal injection openings (not shown) are sealed.

In the LCD panel sealing apparatus of FIG. 1, however, since there is only one pressurizing element, i.e., only one air cylinder 106, if the pressure within each LCD panel is non-uniform, it is impossible to make the pressure uniform. Particularly, when the size of LCD panels is changed, the pressure center of each LCD panel may be shifted to make this pressure more non-uniform. As a result, the gap between the substrate and the counter substrate of each LCD panel fluctuates, so that irregular display occurs, thus degrading the display quality.

Figure 3:
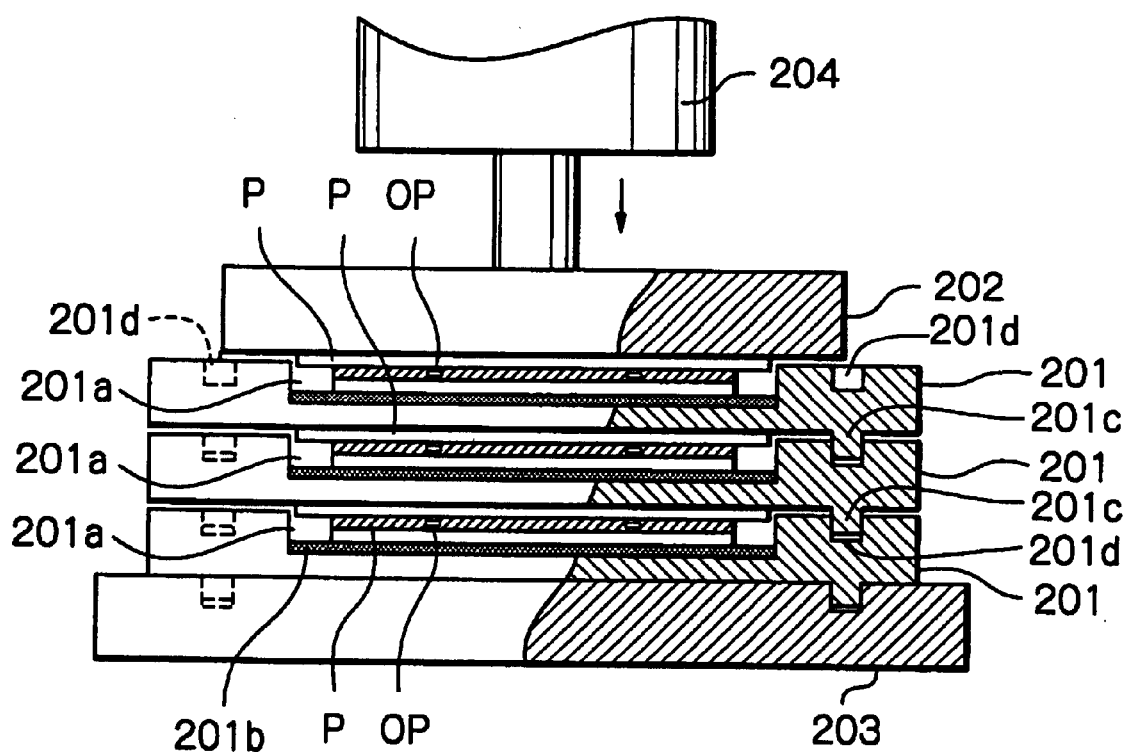
FIG. 3 is a partly-cut front view illustrating a second prior art LCD panel sealing apparatus.

In FIG. 3, which illustrates a second LCD panel sealing apparatus (see JP-A-8-262463), a plurality of holders 201 for accommodating LCD panels P are provided between two plates 202 and 203 pushed by an air cylinder 204. The LCD panels P have liquid crystal injection openings OP.

Each of the holders 201 has a flat bottom housing portion 201a for holding one of the LCD panels P where a spacer sheet 201b is provided. As a result, the depth of the flat bottom housing portion 201a is smaller than the thickness of the LCD panels P. Also, protrusions 201c are provided on the back surface of the holders 201, while recesses 201d are provided on the front surface of the holders 201 in back to back correspondence to the protrusions 201c.

In the LCD panel sealing apparatus of FIG. 3, the gap between the substrate and the counter substrate of each LCD panel is adjusted by the spacer sheet 201b.

Even in the LCD panel sealing apparatus of FIG. 3, however, since there is only one pressurizing element, i.e., only one air cylinder 204, if the pressure within each LCD panel is non-uniform, it is impossible to make the pressure uniform. As a result, the gap between the substrate and the counter substrate of each LCD panel fluctuates, so that irregular display occurs, thus degrading the display quality. In addition, when the size of LCD panels is changed, the holders per se have to be changed, which would increase the manufacturing cost.

Figure 4:
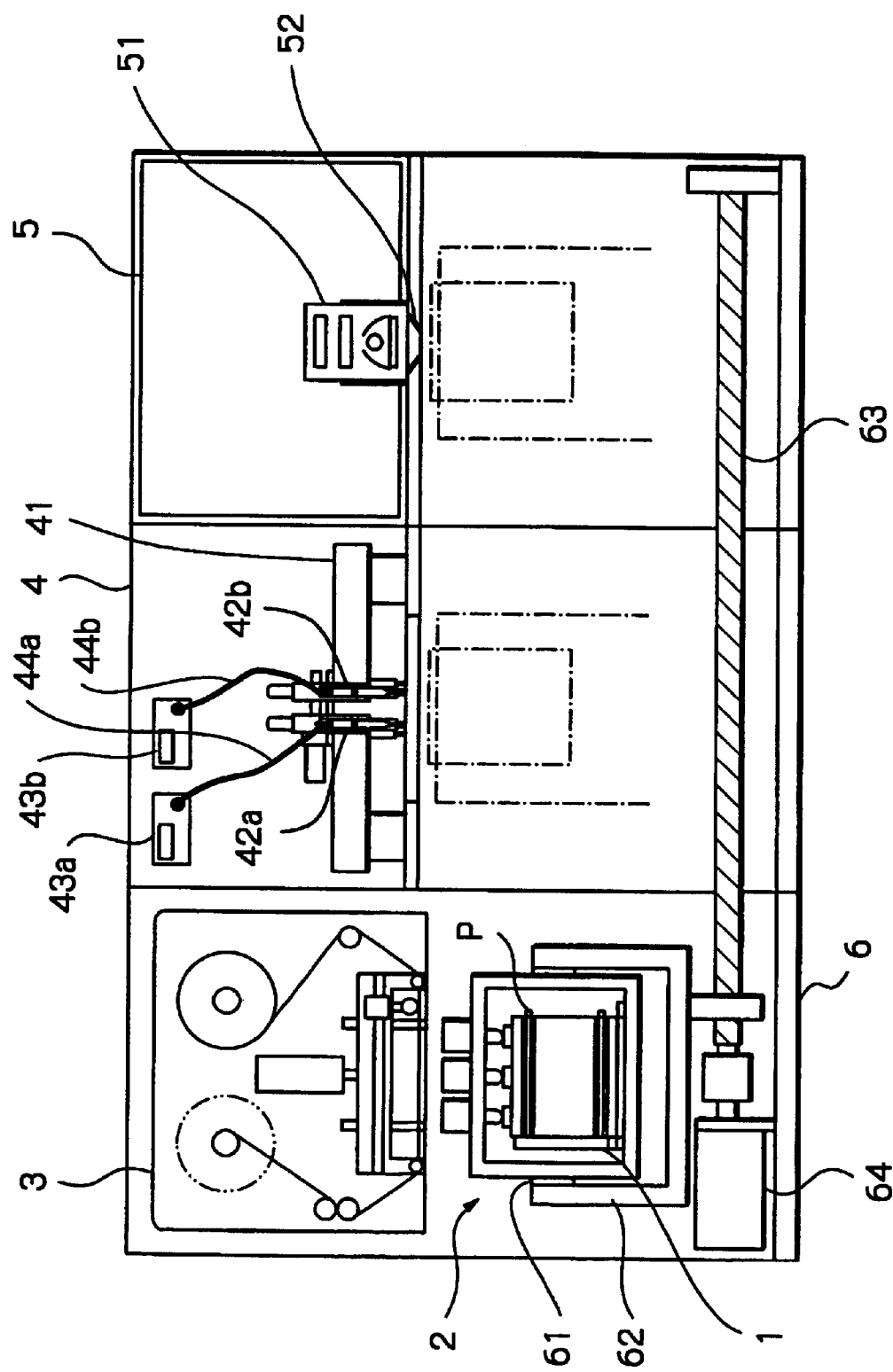
FIG. 4 is a view illustrating an embodiment of the LCD panel sealing apparatus according to the present invention.

In FIG. 4, which illustrates an embodiment of the LCD panel sealing apparatus according to the present invention, an LCD panel sealing apparatus is constructed by a cassette 1, a pressurizing unit 2, a wiping unit 3 for wiping poured liquid crystal, a seal material coating unit 4, an ultraviolet irradiation unit 5 and a carrier unit 6 for carrying the pressurizing unit 2 among the wiping unit 3, the seal material coating unit 4 and the ultraviolet irradiation unit 5.

Figure 5A:
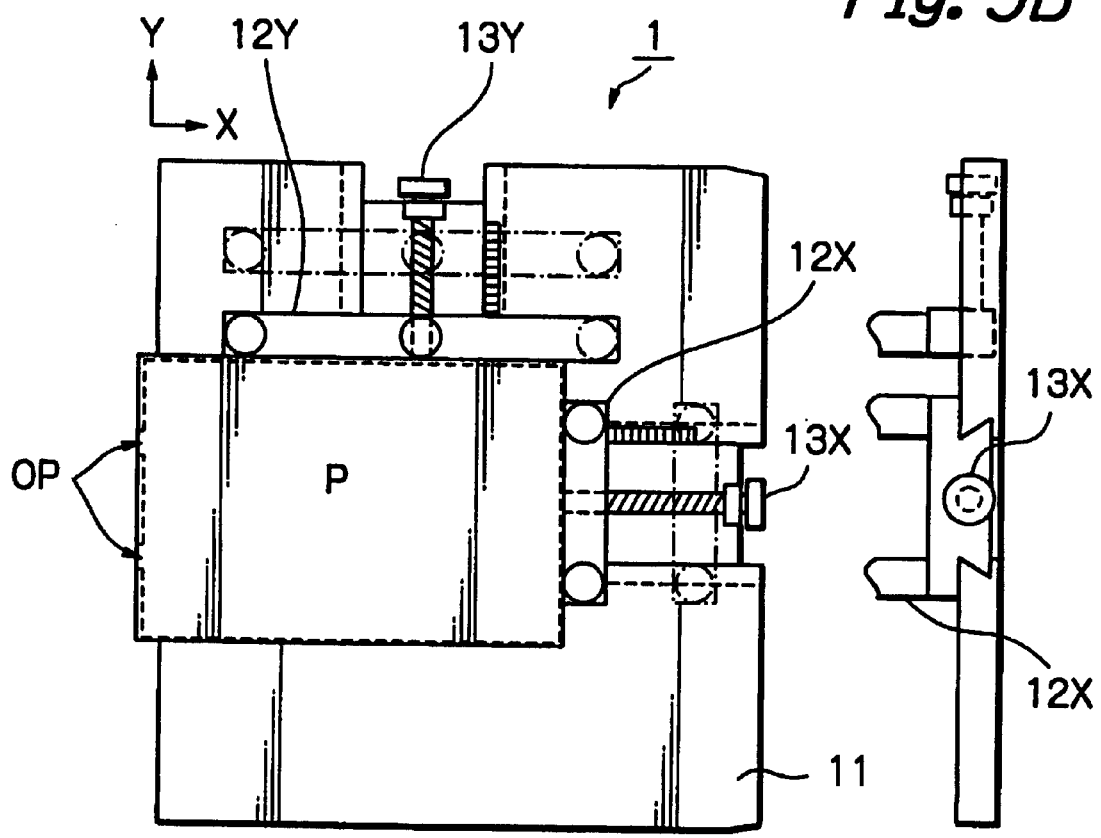
FIG. 5A is a plan view of the cassette of FIG. 4.
Figure 5B:
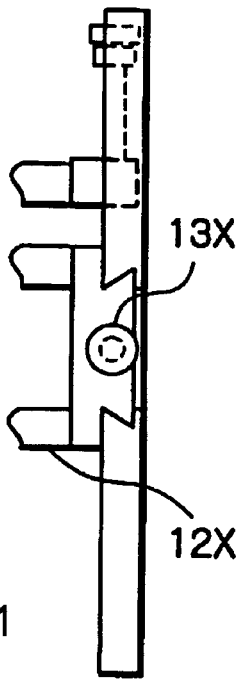
FIG. 5B is a rear view of the cassette of FIG. 5A.
Figure 5C:
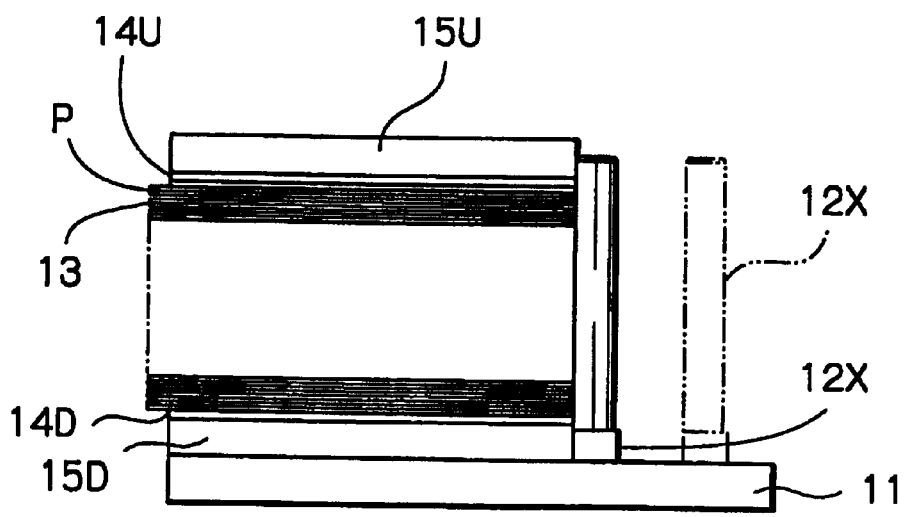
FIG. 5C is a side view of the cassette of FIG. 5A.

In FIGS. 5A, 5B and 5C, which are plan, rear and side views, respectively, of the cassette 1 of FIG. 4, the cassette 1 is constructed by a pedestal 11 on which positioning blocks 12X and 12Y and screws 13X and 13Y are provided. The positioning blocks 12X and 12Y can move in the X- and Y-directions, respectively, and their positions are adjusted manually by the screws 13X and 13Y to be adapted to the size of LCD panels P into which liquid crystal is already injected. In more detail, the LCD panels P alternate with 1 mm thick spacer sheets 13, and are sandwiched by 2 mm thick rubber cushions 14U and 14D and metal plates 15U and 15D. Note that the spacer sheets 13 are made of flexible material such as fluorine resin.

In FIG. 5A, OP designates liquid crystal injection openings of the LCD panels P.

If scales (not shown) are provided on the pedestal 11 for the positioning blocks 12X and 12Y, the positions of the positioning blocks 12X and 12Y can be easily adjusted.

Thus, the positions of the positioning blocks 12X and 12Y are adjusted by the screws 13X and 13Y, respectively, to be adapted to the size of the LCD panels P.

Figure 6A:
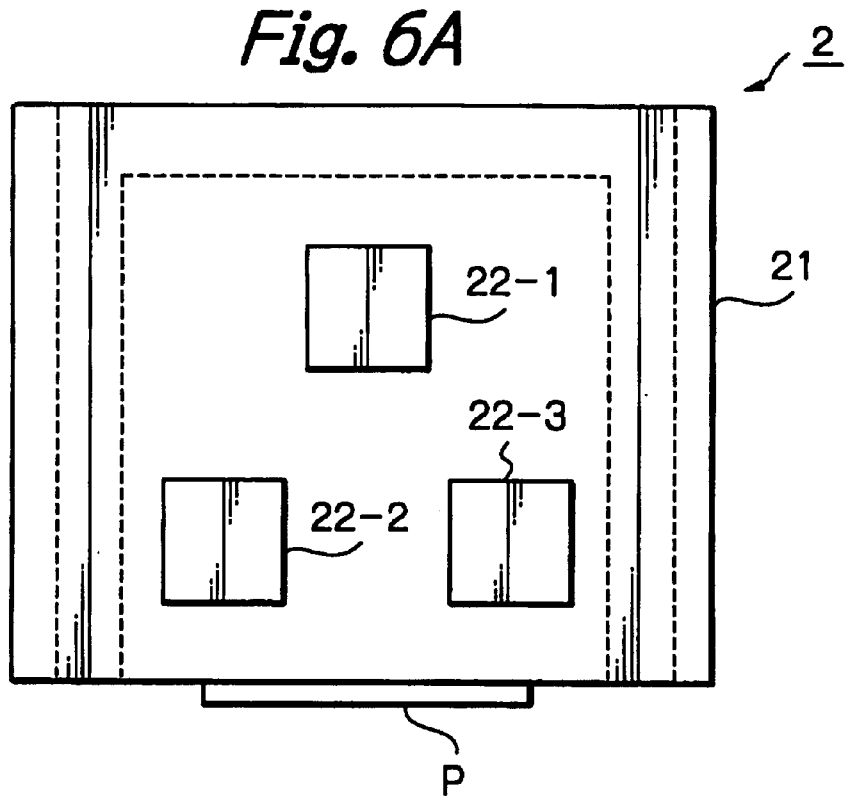
FIG. 6A is a plan view of the pressurizing unit of FIG. 4.
Figure 6B:
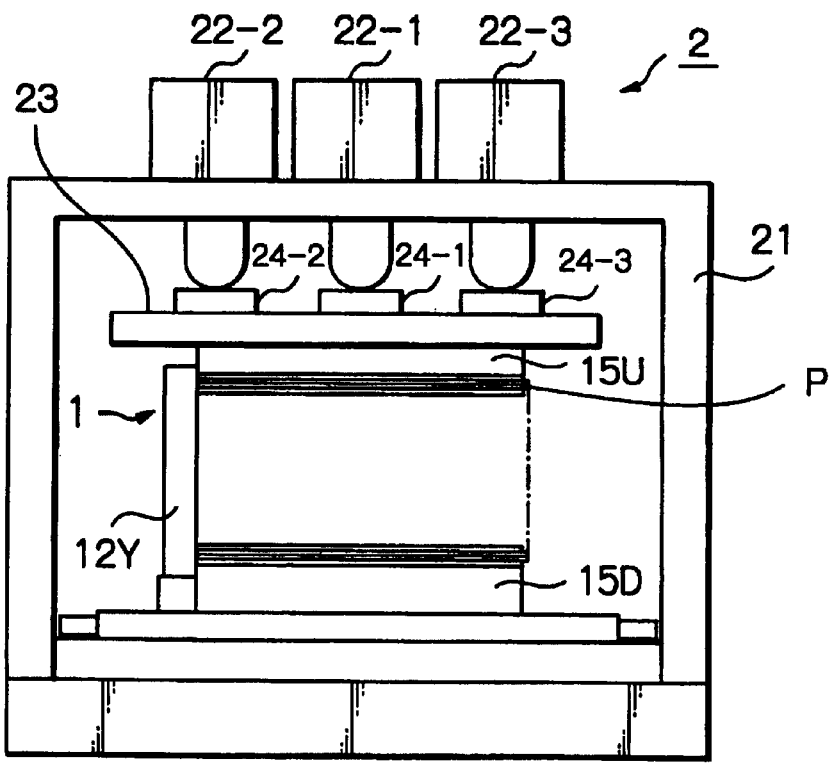
FIG. 6B is a side view of the pressurizing unit of FIG. 6A.

In FIGS. 6A and 6B, which are plan and side views, respectively, of the pressurizing unit 2 of FIG. 4, the pressurizing unit 2 is constructed by a frame 21 on which three 100 mm-diameter actuators 22-1, 22-2 and 22-3 are provided. In this case, the actuators 22-1, 22-2 and 22-3 are not aligned, i.e., dispersed radially. The actuators 22-1, 22-2 and 22-3 are formed by fluid cylinders, for example.

A 25 mm thick metal plate 23 is placed on the metal plate 15U of the cassette 1. Also, pressure sensors 24-1, 24-2 and 24-3 corresponding to the actuators 22-1, 22-2 and 22-3, respectively, are mounted on the metal plate 23. Each of the pressure sensors can detect a maximum pressure of 200 kgf, for example.

Thus, the actuators 22-1, 22-2 and 22-3 are individually controlled, so that the pressure within each of the LCD panels P can be uniform.

The pressurizing unit 2 is rotatably supported by a shaft 61 on a strut 62. As a result, when the pressurizing unit 2 is rotated by 90° using a rotating mechanism (not shown), the liquid crystal injection openings OP (see FIG. 5A) are upward.

Figure 7A:
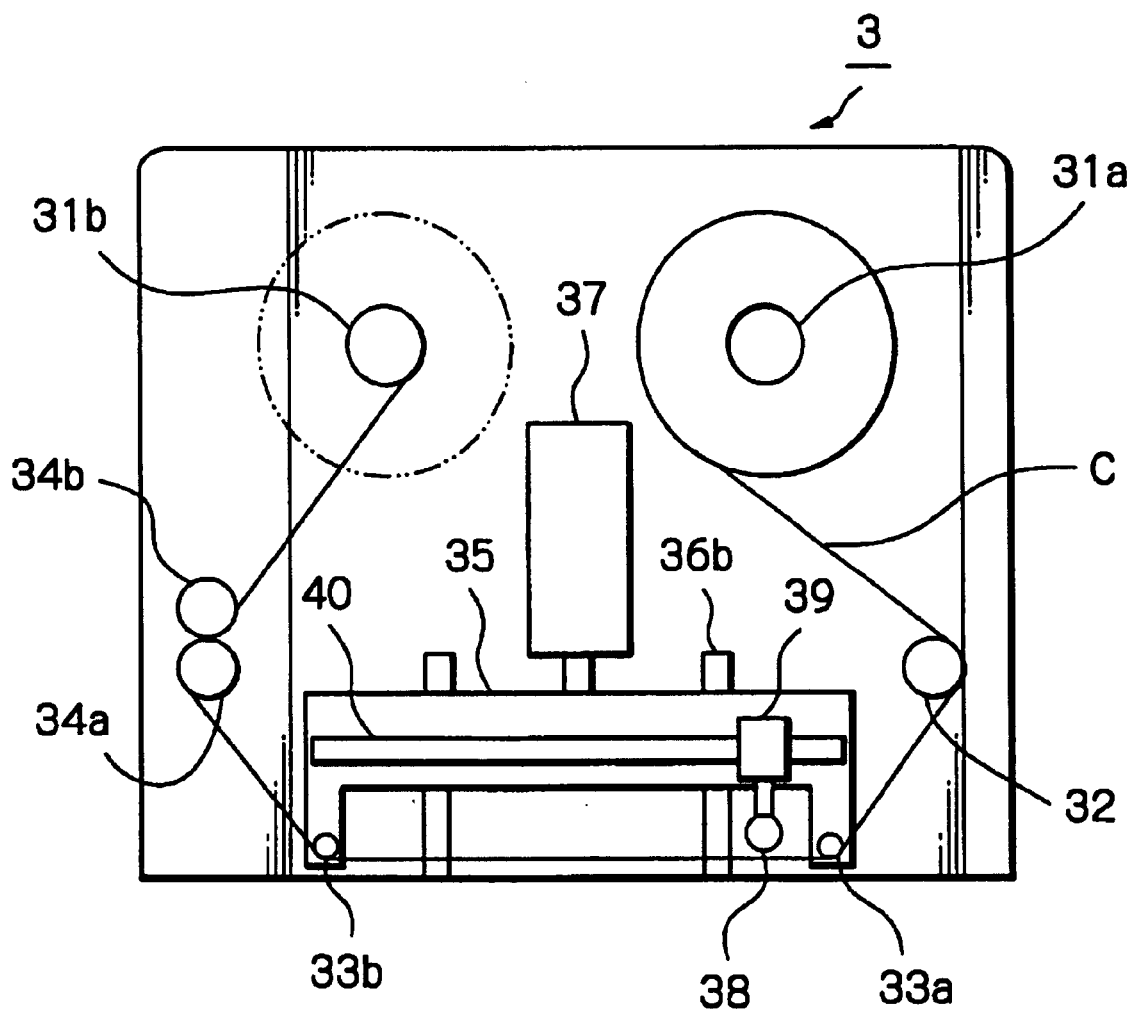
FIG. 7A is a detailed front view of the wiping unit of FIG. 4.

In FIG. 7A, which is a detailed front view of the wiping unit 3 of FIG. 4, the wiping unit 3 is constructed by a spool 31a on which a 200 mm wide cloth C is wound and a spool 31b for winding the cloth C. Provided between the spools 31a and 31b are a tension roll 32, guide rolls 33a and 33b for pushing the cloth C, and feed rolls 34a and 34b for feeding the cloth C. Note that one of the feed rolls 34a and 34b is driven by a torque motor (not shown).

The guide rolls 33a and 33b are mounted on a subbase 35 which can move upward and downward along guide shafts 36a and 36b using an actuator 37.

Also, a roller 38 is provided on an actuator 39 which can move horizontally along a guide shaft 40 fixed to the subbase 35. The roller 38 can move upward and downward using the actuator 39.

Figure 7B:
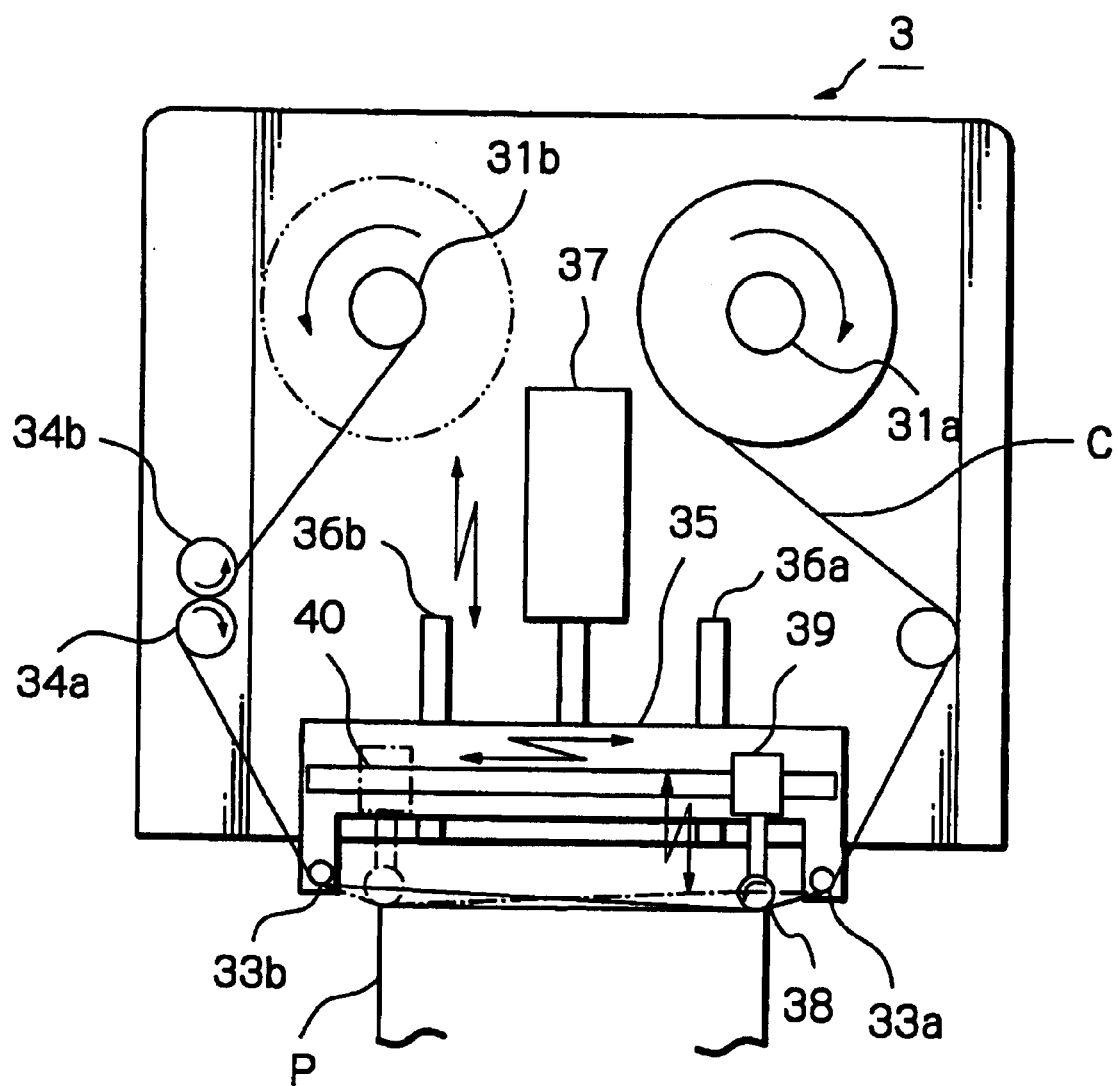
FIG. 7B is a front view of the wiping unit of FIG. 7A for explaining the operation thereof.

The operation of the wiping unit 3 of FIG. 7A is explained next with reference to FIG. 7B.

First, the subbase 35 is moved down toward the liquid crystal injection openings OP of one of the LCD panels P by the actuator 37.

Next, the roller 38 is moved down by the actuator 39, so that the cloth C is in contact with one of the LCD panels P.

Next, the roller 38 is moved from a start position adjacent to the roller 33a to an end position adjacent to the roller 33b by an actuator (not shown), so that the cloth C is surely in contact with crystal liquid poured from the liquid crystal injection openings OP. Thus, the poured liquid crystal can be surely wiped.

Next, the roller 38 is moved up by the actuator 39 and returns to the start position by the actuator (not shown).

Finally, a part of the cloth C corresponding to one wiping operation is wound on the spool 31b, to prepare for the next wiping operation of another one of the LCD panels P.

In the above-described wiping operation, since no friction is generated between the LCD panels P and the cloth C, static electricity is hardly generated.

Returning to FIG. 4, the seal material coating unit 4 is constructed by an XY robot 41 for moving Z-axis heads 42a and 42b apart at a predetermined distance along the X direction. The Z-axis heads 42a and 42b can move along the Z direction. The Z-axis heads 42a and 42b are supplied with pressurized air from controllers 43a and 43b via air feed tubes 44a and 44b.

Figure 8:
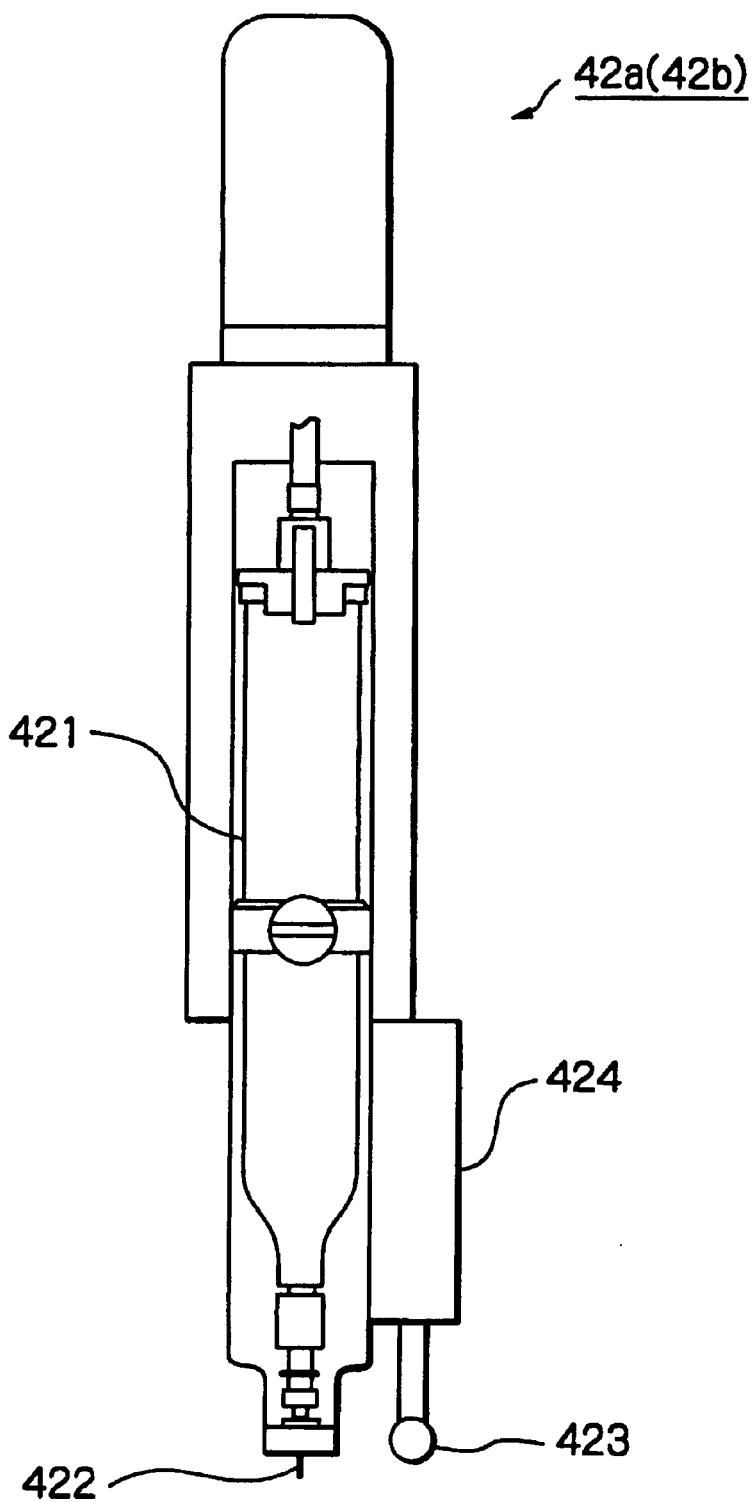
FIG. 8 is a detailed front view of the head of FIG. 4.

In FIG. 8, which illustrates the head 42a(42b) of FIG. 4, the head 42a(42b) is constructed by a container 421 for storing seal material such as ultraviolet cured resin, a nozzle 422 provided at the tip of the container 421, a position detecting roller 423 and an actuator 424 for moving the position detecting roller 423 upward and downward.

The operation of the seal material coating unit 4 is explained next with reference to FIGS. 9A, 9B, 9C and 9D, where only the Z-axis head 42a is illustrated.

Figure 9A:
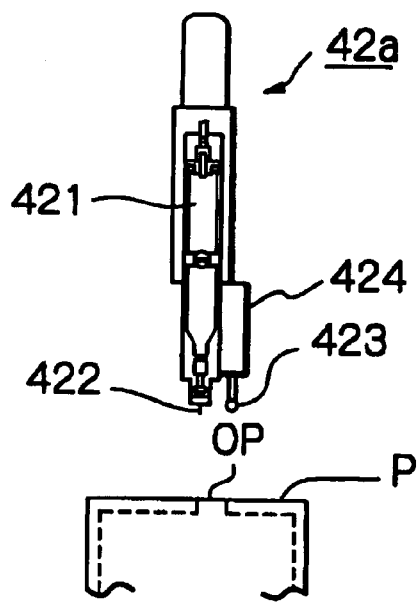
FIGS. 9A, 9B, 9C and 9D are views for explaining the operation of the seal material coating unit of FIG. 8.

First, referring to FIG. 9A, the Z-axis head 42a is moved down while the position detecting roller 423 is projected by the actuator 424.

Figure 9B:
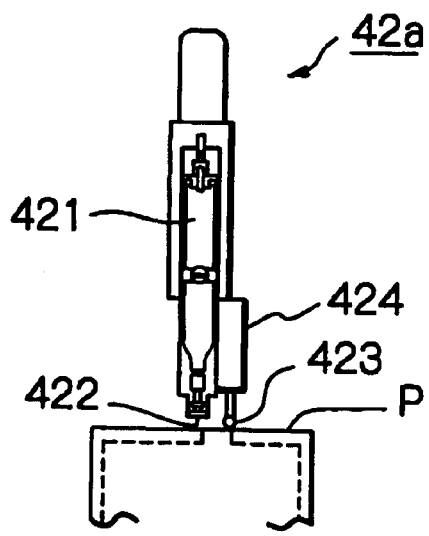

Next, referring to FIG. 9B, when the position detecting roller 423 is in contact with an LCD panel P, the Z-axis head 42a is stopped. Then, the position detecting roller 423 is moved up by the actuator 424.

Figure 9C:
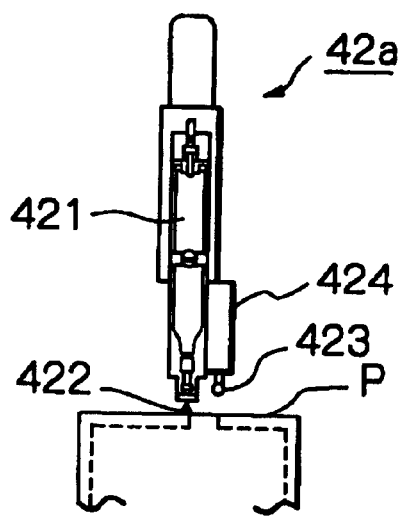

Next, referring to FIG. 9C, a seal material is poured from the container 421 via the nozzle 422.

Figure 9D:
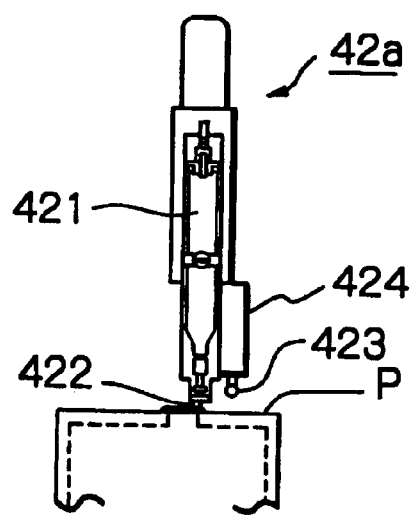

Finally, referring to FIG. 9D, the Z-axis head 42a is moved along the X direction while the seal material is being poured.

Thus, the liquid crystal injection opening OP of the LCD panel P is completely clogged by the seal material.

Returning to FIG. 4, the ultraviolet irradiation unit 5 is constructed by an ultraviolet ray lamp 51 and an irradiation guide 52. The irradiation amount of ultraviolet rays is monitored by an ultraviolet accumulator (not shown) to compensate for any deterioration of the ultraviolet ray lamp 51.

The carrier unit 6 includes a ball screw 63 and a servo motor 64 for driving the ball screw 63, in addition to the shaft 61 and the strut 62. The strut 62 is mounted on the ball screw 63, so that the pressurizing unit 2 rotatably supported by the shaft 61 to the strut 62 moves along a carrier guide (not shown). Thus, the carrier unit 6 can move the pressurizing unit 2 among the wiping unit 3, the seal material coating unit 4 and the ultraviolet irradiation unit 5.

Figure 10A:
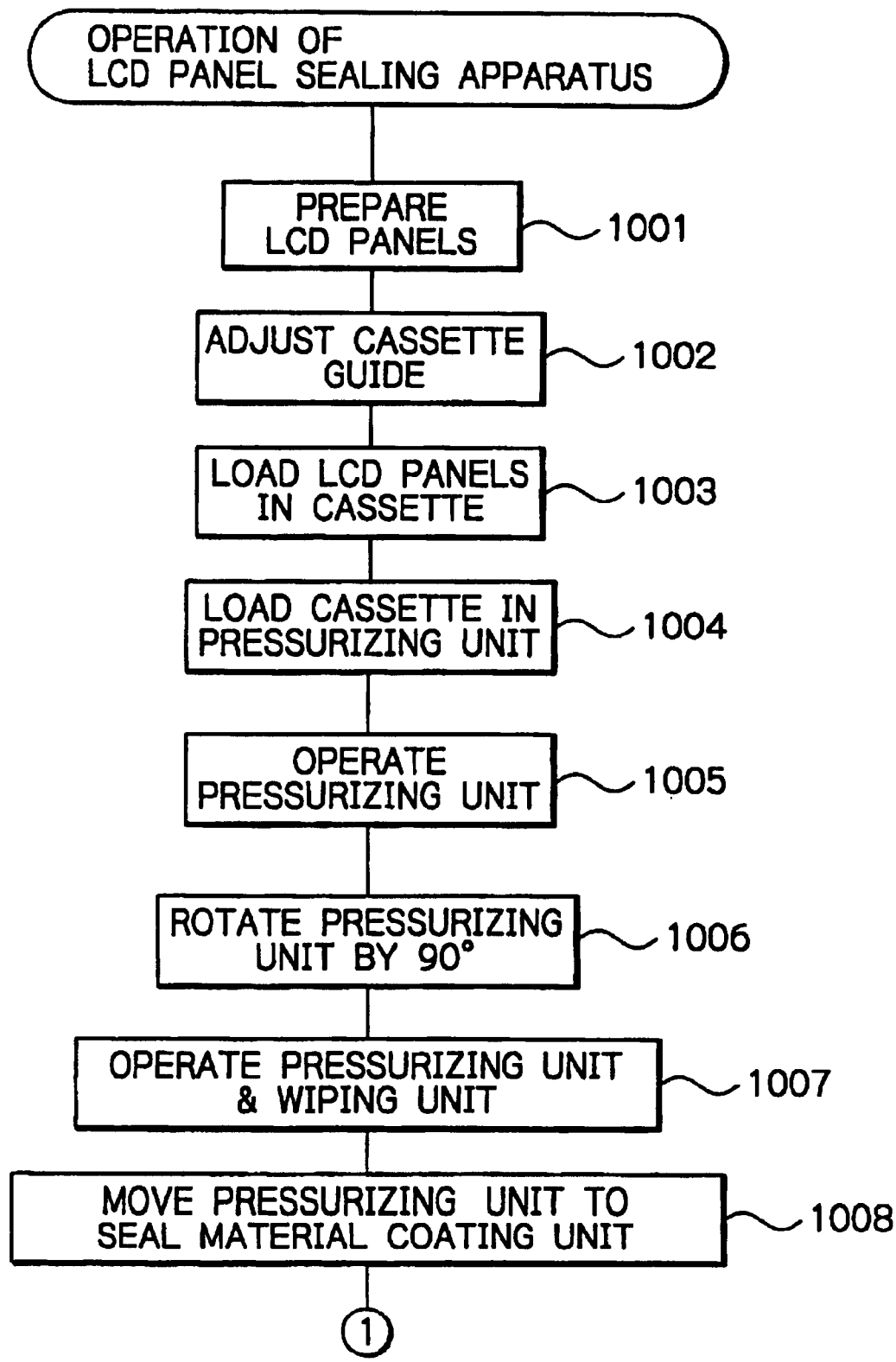
FIGS. 10A and 10B are flowchart showing the operation of the LCD panel sealing apparatus of FIG. 4.
Figure 10B:
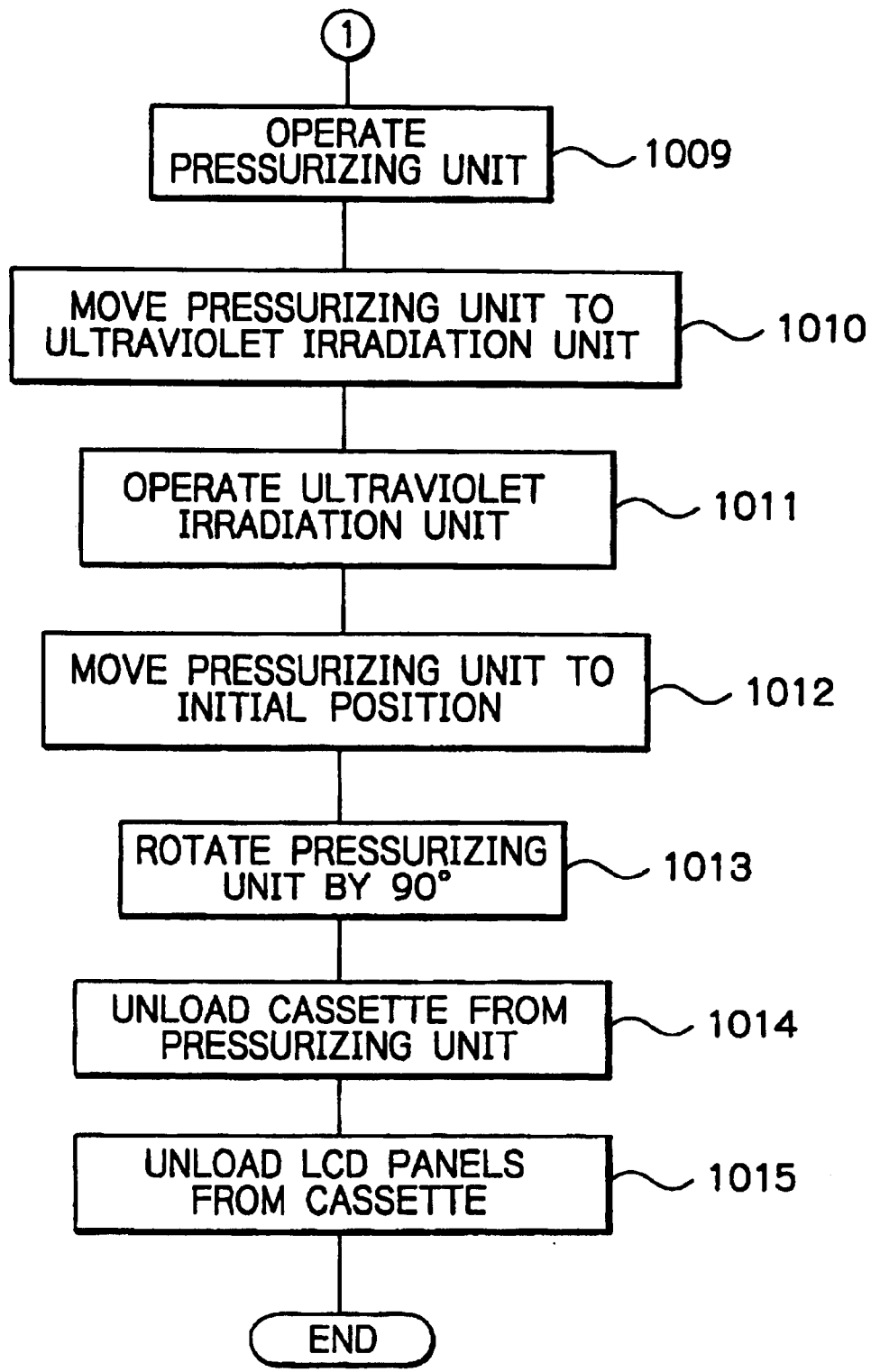

The operation of the LCD panel sealing apparatus of FIG. 4 is explained next with reference to FIGS. 10A and 10B.

First, at step 1001, a plurality of LCD panels P into which liquid crystal is already injected are prepared. In this case, the gap of each LCD panel is increased due to the injected liquid crystal. For example, this gap is about 5 to 6 μm. Also, the number of the LCD panels P is 44, for example.

Next, at step 1002, the guide of the cassette 1, i.e., the positioning blocks 12X and 12Y are adjusted to be adapted to the size of the LCD panels P.

Next, at step 1003, the LCD panels P are loaded in the cassette 1. In more detail, the LCD panels P alternate with spacer sheets 13, and are sandwiched by rubber cushions 14U and 14D and metal plates 15U and 15D.

Next, at step 1004, the cassette 1 is loaded in the pressurizing unit 2 which is located at an initial location. In more detail, the cassette 1 is placed on the frame 21, and then, the metal plate 23 associated with the pressure sensors 24-1, 24-2 and 24-3 is placed on the cassette 1 so that the pressure sensors 24-1, 24-2 and 24-3 correspond to the actuators 22-1, 22-2 and 22-3, respectively.

Next, at step 1005, the pressurizing unit 2 i operated, that is, the pressurizing actuators 22-1, 22-2, and 22-3 are individually driven by the feedback of the output signals of the pressure sensors 24-1, 24-2, 24-3. In this case, each of the values of the output signals of the pressure sensors 24-1, 24-2, and 24-3 is brought close to a value which is one third of an initial total pressure such as 60 kfg, so that the pressure within each of the LCD panels P is made uniform.

Next, at step 1007, the pressurizing unit 2 is operated, that is, the pressurizing actuators 22-1, 22-2, and 22-3 are individually driven by the feedback of the output signals of the pressure sensors 24-1, 24-2, and 24-3. In this case, each of the values of the output signals of the pressure sensors 24-1, 24-2, and 24-3 is gradually increased to a value such as about 0.2 to 5 kg/cm$^2$, so that the pressure within each of the LCD panels P is also made uniform. Simultaneously, since liquid crystal is poured from the liquid crystal injection openings OP of the LCD panels P, the wiping unit 3 is operated to wipe up the poured liquid crystal. While the wiping unit 3 is being operated four times, the pressurizing unit 2 is operated, so that the values of the output signals of the pressure sensors 24-1, 24-2, and 24-3 are gradually decreased to a value such as 1 kg/cm$^2$, to stop the liquid crystal from being poured.

Note that if the poured crystal liquid is incompletely wiped up, the coating and curing operation of a seal material will not work.

Next, at step 1008, the pressurizing unit 2 is moved to the seal material coating unit 4, so that a seal material such as ultraviolet cured resin is coated on the liquid crystal injection openings OP.

Next, at step 1009, the pressurizing unit 2 is operated, that is, the ressurizing actuators 22-1, 22-2, and 22-3 are individually driven by the feedback of the output signals of the pressure sensors 24-1, 24-2, and 24-3. In this case, each of the values of the output signals of the pressure sensors 24-1, 24-2, and 24-3 is gradually decreased to zero, so that the pressure within each of the LCD panels P is also made uniform. Thus, the liquid crystal injection openings OP of the LCD panels P are completely sealed.

Next, at step 1010, the pressurizing unit 2 is moved to the ultraviolet irradiation unit 5.

Next, at step 1011, the ultraviolet irradiation unit 5 is operated. As a result, the seal material is irradiated with ultraviolet rays, so that the seal material is cured and hardened.

Next, at step 1012, the pressurizing unit 2 is moved to the initial location.

Next, at step 1013, the pressurizing unit 2 is rotated by 90° using the rotating mechanism (not shown), so that the LCP panels P are horizontal. Also, in this case, the pressurizing actuators 22-1, 22-2 and 22-3 are released.

Next, at step 1014, the cassette 1 is unloaded from the pressurizing unit 2.

Next, at step 1015, the LCD panels P are unloaded one by one from the cassette 1.

Thus, the operation of the LCD panel sealing apparatus of FIG. 4 is completed.

In the above-described embodiment, although the number of pressurizing actuators is three, the number of pressurizing actuators can be four or more.

As explained hereinabove, according to the present invention, since the pressurizing actuators are individually controlled, the pressure within each LCD panel is made uniform, which would not degrade the display quality. Also, since the cassette is adapted to various sizes of LCD panels, the manufacturing cost can be decreased.

What is claimed is:

1. A liquid crystal display panel sealing apparatus, comprising:

a cassette for accommodating a plurality of laminated liquid crystal display panels into which liquid crystal is injected; and a pressurizing unit for accommodating said cassette, said pressurizing unit comprising a plurality of pressurizing actuators for pressurizing said liquid crystal display panels.

2. The apparatus as set forth in claim 1, wherein said cassette comprises a guide unit for guiding said liquid crystal display panels in accordance with a size of said liquid crystal display panels.

3. The apparatus as set forth in claim 1, wherein said cassette comprises:

a pedestal;

an X-direction positioning block provided on said pedestal;

a Y-direction positioning block provided on said pedestal; and screws for adjusting said X-direction positioning block and said Y-direction positioning block.

4. The apparatus as set forth in claim 3, further comprising, scales provided on said pedestal operable for positioning said X-direction positioning block and said Y-direction positioning block.

5. The apparatus as set forth in claim 1, wherein said pressurizing actuators are dispersed radially.

6. The apparatus as set forth in claim 1, wherein said pressurizing unit further comprises a plurality of pressure sensors, each corresponding to one of said pressurizing actuators, so that said pressurizing actuators are individually driven by output signals of said pressure sensors.

7. The apparatus as set forth in claim 1, further comprising:

a wiping unit for wiping up liquid crystal spilled from said liquid crystal display panels while said pressurizing unit is being operated;

a seal material coating unit for coating seal material on liquid crystal injection openings of said crystal display panels;

an ultraviolet irradiation unit for irradiating said seal material with ultraviolet rays; and a carrier unit for carrying said pressurizing unit among said wiping unit, said seal material coating unit and said ultraviolet irradiation unit.

8. A method for sealing liquid crystal display panels, comprising:

adjusting a cassette to be adapted to a size of said liquid crystal display panels;

loading said liquid crystal display panels in said cassette;

loading said cassette in a pressurizing unit having a plurality of pressurizing actuators; and individually driving said pressurizing actuators to pressurize said liquid crystal display panels, so that a pressure within each of said liquid crystal display panels is made uniform.

9. The method of as set forth in claim 8, wherein said individual pressurizing actuator driving step carries out a feedback control operation using pressure signals of pressure sensors each provided for one of said pressurizing actuators.

10. The method as set forth in claim 8, further comprising:

activating said pressurizing unit so that said pressurizing actuators are individually driven by a feedback control using pressure signals of pressure sensors corresponding to each of said pressurizing actuators; and regulating an output value of said pressure signals of said pressure sensors such that said output value is one-third of an initial total pressure.

11. The method as set forth in claim 10, wherein, said output value is gradually increased to a range of 0.2 to 5 $kg/cm^2$.

12. The method as set forth in claim 10, wherein, said output value is gradually decreased to a value of 1 $kg/cm^2$.

13. The method as set forth in claim 10, wherein, said output value is gradually decreased to 0.

* * * * *